(12) United States Patent
Romera Formiguera

(10) Patent No.: US 11,801,982 B2
(45) Date of Patent: Oct. 31, 2023

(54) RECYCLABLE CAP FOR CONTAINERS

(71) Applicant: PUJOLASOS, S.L., Barcelona (ES)

(72) Inventor: Gal-la Romera Formiguera, Barcelona (ES)

(73) Assignee: PUJOLASOS, S.L., Barcelona (ES)

(*) Notice: Subject to any disclaimer, the term of this patent is extended or adjusted under 35 U.S.C. 154(b) by 0 days.

(21) Appl. No.: 17/920,508

(22) PCT Filed: Apr. 23, 2021

(86) PCT No.: PCT/ES2021/070269
§ 371 (c)(1),
(2) Date: Oct. 21, 2022

(87) PCT Pub. No.: WO2021/214365
PCT Pub. Date: Oct. 28, 2021

(65) Prior Publication Data
US 2023/0123903 A1     Apr. 20, 2023

(30) Foreign Application Priority Data
Apr. 23, 2020 (ES) .............................. ES202030340

(51) Int. Cl.
*B65D 65/46* (2006.01)
*B65D 41/34* (2006.01)
*B65D 51/18* (2006.01)

(52) U.S. Cl.
CPC .......... *B65D 65/466* (2013.01); *B65D 41/34* (2013.01); *B65D 51/18* (2013.01); *B65D 2565/385* (2013.01)

(58) Field of Classification Search
CPC ...... B65D 65/466; B65D 41/34; B65D 51/18; B65D 2565/385; B65D 51/226; B65D 51/228
(Continued)

(56) References Cited

U.S. PATENT DOCUMENTS 2,151,508 A * 3/1939 Glensky ............... B65D 41/62
215/326
2,426,101 A * 8/1947 Hutaff, Jr. ............ B65D 51/243
215/257
(Continued)

FOREIGN PATENT DOCUMENTS

ES      1234399 U      9/2019
ES      1242713 U      3/2020

OTHER PUBLICATIONS

Translation of ES 1242713 from Espacenet. https://worldwide.espacenet.com/publicationDetails/description?CC=ES&NR=1242713U&KC=U&FT=D&ND=3&date=20200304&DB=EPODOC&locale=en_EP (Year: 2023).*
(Continued)

*Primary Examiner* — James N Smalley
(74) *Attorney, Agent, or Firm* — Hassan Abbas Shakir; Shakir Law PLLC

(57) ABSTRACT

A recyclable cap for containers includes an outer body and an inner body provided with fixing means for being retained in a container, the inner body being coupled and housed inside the outer body, wherein the outer body is made of a biodegradable material of plant origin, wherein the outer body and the inner body are coupled by coupling means configured for linking the two bodies to one another, the inner body including a single-use release system configured for separating the outer body from the inner body. A user may thereby separate and recycle the outer body and the inner body in an entirely separate manner at the end of the service life thereof.

13 Claims, 11 Drawing Sheets

(58) Field of Classification Search
USPC ........ 220/258.1–258.3, 258.5, 285; 215/204, 215/254, 257
See application file for complete search history.

(56) References Cited

U.S. PATENT DOCUMENTS

| | | | | | |
|---|---|---|---|---|---|
| 2,837,233 | A | * | 6/1958 | Kravitz | B65D 41/62 |
| | | | | | 215/257 |
| 4,773,557 | A | * | 9/1988 | Ohta | B65D 51/20 |
| | | | | | 220/258.2 |
| 6,497,336 | B2 | * | 12/2002 | Grayer | B65D 77/2056 |
| | | | | | 220/359.3 |
| 6,726,048 | B2 | * | 4/2004 | Dwinell | B65D 39/08 |
| | | | | | 220/259.3 |
| 2003/0201266 | A1 | * | 10/2003 | Steffan | B65D 59/06 |
| | | | | | 215/254 |
| 2008/0041810 | A1 | * | 2/2008 | Itoh | B65D 41/3428 |
| | | | | | 215/316 |

OTHER PUBLICATIONS

International Search Report for related patent application PCT/ES2021/070269 prepared by the European Patent Office and dated Sep. 6,2021, in English, 3 pgs.
Written Opinion of the International Searching Authority for related patent application PCT/ES2021/070269 prepared by the European Patent Office and dated Sep. 6, 2021, in English, 3 pgs.

* cited by examiner

RECYCLABLE CAP FOR CONTAINERS

CROSS-REFERENCE TO RELATED APPLICATIONS

This application is a national stage under 35 U.S.C. § 371 of PCT patent application PCT/ES2021/070269 filed on 23 Apr. 2021, which is pending and which is hereby incorporated by reference in its entirety for all purposes. PCT/ES2021/070269 claims priority to Spanish patent application P202030340 filed 23 Apr. 2020, which is hereby incorporated by reference in its entirety for all purposes.

OBJECT OF THE INVENTION

The invention is directed to a recyclable cap intended for being assembled in containers, essentially being formed by two bodies or parts linked to one another and each of them being made of a different material.

More particularly, the invention is directed to a recyclable cap for containers for cosmetic products, perfumes, skin treatments or the like.

BACKGROUND OF THE INVENTION

In the packaging sector, there is a wide range of caps depending on the needs of the sector of the art differing from one another not only by the geometric shape or dimensions thereof but also by their structural design for the purpose of finding alternatives to caps which are not only suitably functional, but which are also appealing to users. A cap for containers having a decorative casing made of a biodegradable, natural material, and a further element made of a plastic or metallic material, acting as a plugging means and/or fixing means, utilising its natural properties, has thus been developed for this purpose.

While it may be appealing for a manufacturer to manufacture a cap from a natural material, it is not as appealing from an environmental viewpoint given that the user disposes of the cap as a single part, which may lead to not recycling parts of the cap and, accordingly, not reusing same.

Therefore, there is still a need for a cap provided with two bodies that is reliable during use, with both bodies remaining attached in a non-detachable manner and at the same time being individually recyclable for each of the parts or pieces forming the cap or lid.

Document ES 1242713 U, describing a cap using a natural material, the common features of which are part of the preamble of claim 1, is known.

Furthermore, the applicant is currently unaware of an invention that has all the features described in this specification.

DESCRIPTION OF THE INVENTION

The present invention has been developed with the aim of providing a recyclable cap for containers which is configured as a novelty within the field of application and solves the aforementioned drawbacks, further contributing other additional advantages which will be obvious from the description below.

It is therefore an object of the present invention to provide a recyclable cap for containers of the type comprising an outer body and an inner body provided with fixing means for being retained in a container, either directly in an opening thereof, with an extension or accessory present in said area to make it easier for the product housed inside the container to come out, with the body being coupled and housed inside said outer body.

In particular, the invention is characterised in that the outer body is made of a biodegradable material of plant origin, wherein the outer body and the inner body are coupled by coupling means configured for linking the two bodies to one another, the inner body including a single-use release system configured for separating the outer body from the inner body. The cap may optionally include anti-rotation blocking means acting on the outer and inner bodies.

As a result of these features, a cap is obtained comprising two bodies or pieces made of a different material which, at the end of the service life thereof, the user can manually separate and thus recycle the outer body and the inner body in an entirely separate manner, thus favouring the action of recycling by the users of containers and the subsequent waste processing or management for each of the materials forming the body of the cap.

Moreover, the arrangement of anti-rotation means (depending on the structural configuration of the two inner and outer bodies) ensures the proper operation of the cap, for example, during the actions of placing the cap on and/or separating the cap from a container.

According to a preferred embodiment, the release system is comprised of at least one perforated line arranged in a side wall present in the inner body, said at least one perforated line extending from a rim at one end towards the opposite end.

Preferably, at least said perforated line is formed by a cross-section having a smaller thickness than the rest of the side wall. However, in an alternative manner, it is also possible for at least said perforated line to be formed by a die cut line running along the side wall.

According to another aspect of the invention, the aforementioned coupling means may consist of tabs projecting from the outer face of the inner body which can be fitted in a non-releasable manner in housings made on the inner face of the outer body.

Preferably, the anti-rotation blocking means may comprise a flange protruding out of the inner body which can be fitted in an immovable manner in a groove made in the outer body.

In a preferred embodiment, the fixing means comprise a threading made on the inner face of the inner body which will be complementary to a threaded portion made in the container to be coupled.

Alternatively, the fixing means may comprise protrusions protruding from the inner face of the inner body, thus providing a snap-on closure.

Advantageously, the release system comprises a plurality of perforated lines, preferably being arranged in regions close to each of the aforementioned protrusions.

Preferably, the material of the outer body consists of wood or a wood-based composite.

Thus, the recyclable cap for containers that is described represents an innovative structure with structural and constituent features heretofore unknown for its intended purpose, reasons which, taken together with its usefulness, provide it with sufficient grounds for obtaining the requested exclusivity privilege.

In this specification, cap shall be understood to mean a cap or lid per se and is applicable to any sector, being particularly applicable in the field of containers for cosmetics, perfumes, body care products, but without this being limiting for the object of the invention.

Other features and advantages of the recyclable cap for containers object of the present invention will be evident in light of the description of a preferred, but not exclusive, embodiment which is illustrated by way of a non-limiting example in the drawings which are attached, wherein:

DESCRIPTION OF A PREFERRED EMBODIMENT

In light of the aforementioned figures, and in accordance with the adopted numbering, one may observe therein a preferred exemplary embodiment of the invention, which comprises the parts and elements indicated and described in detail below.

Example 1

As can be seen in FIGS. 1 to 4, this first embodiment of the recyclable cap for containers comprises an outer body (1) in the form of a cap and an inner body (2) also in the form of a cap, provided with fixing means configured for being retained on a neck of a container (not depicted) or on a product extraction accessory (for example, a sprayer or a conventional dispenser) assembled on the actual neck or opening of the container, with the inner body (2) being coupled and housed inside said outer body (1).

Figure 1:
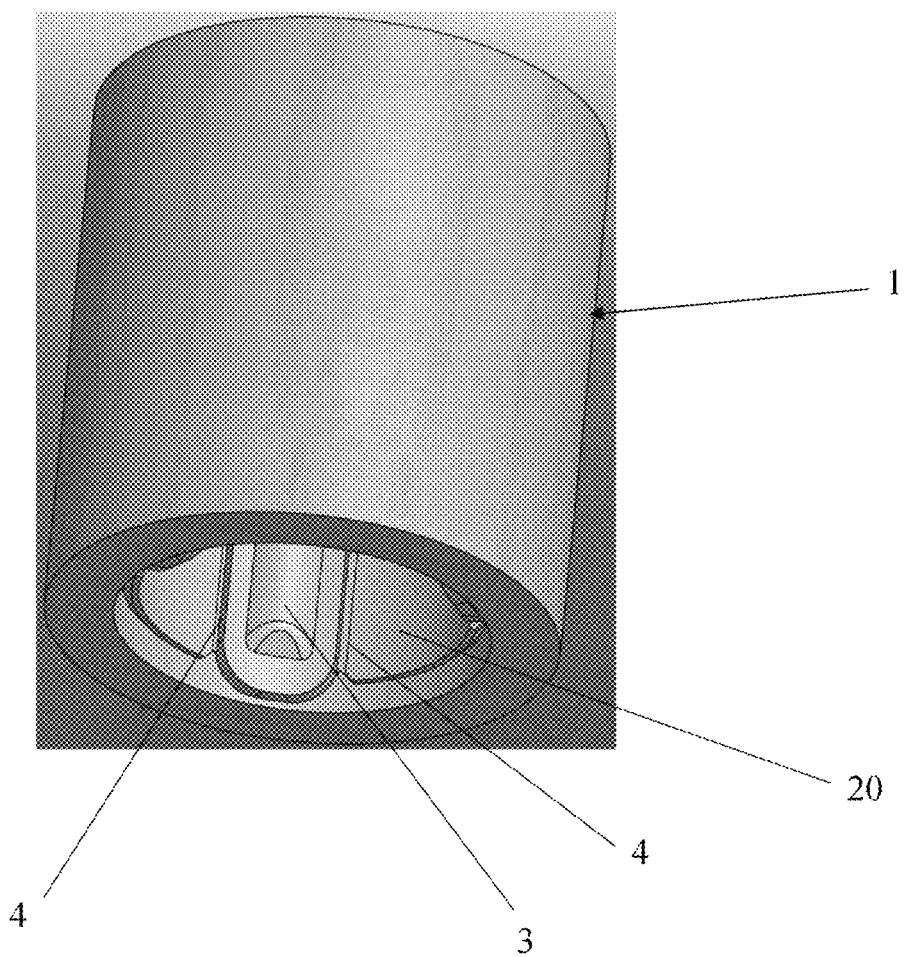
FIG. 1 is a perspective view of a first embodiment of a cap according to the present invention.
Figure 2:
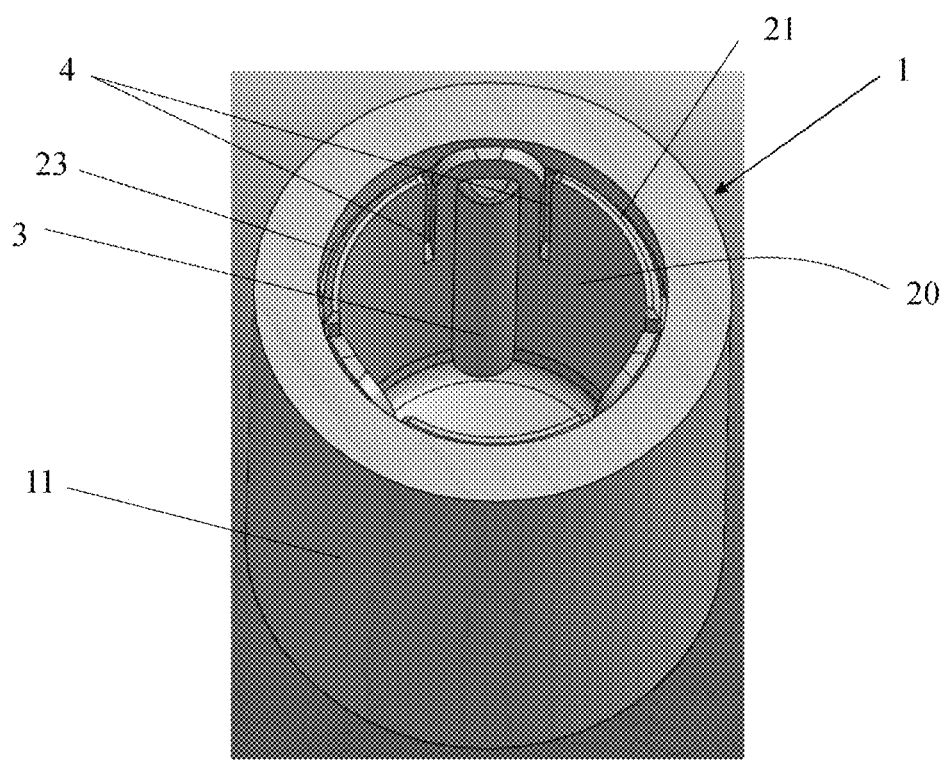
FIG. 2 is a perspective view from another viewpoint of the cap depicted in FIG. 1, which includes an enlarged detail of a region of the cap for the sake of clarity.
Figure 2:
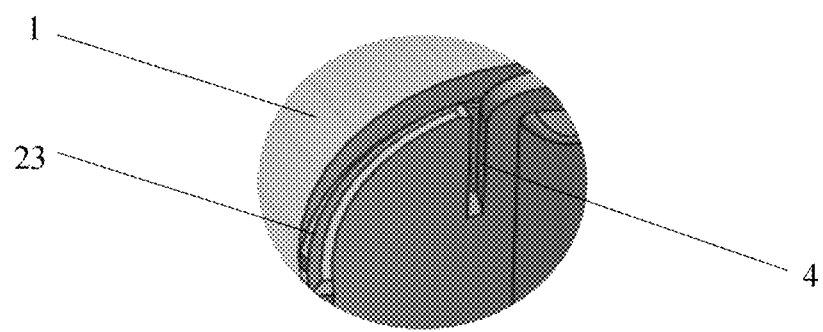
Figure 4:
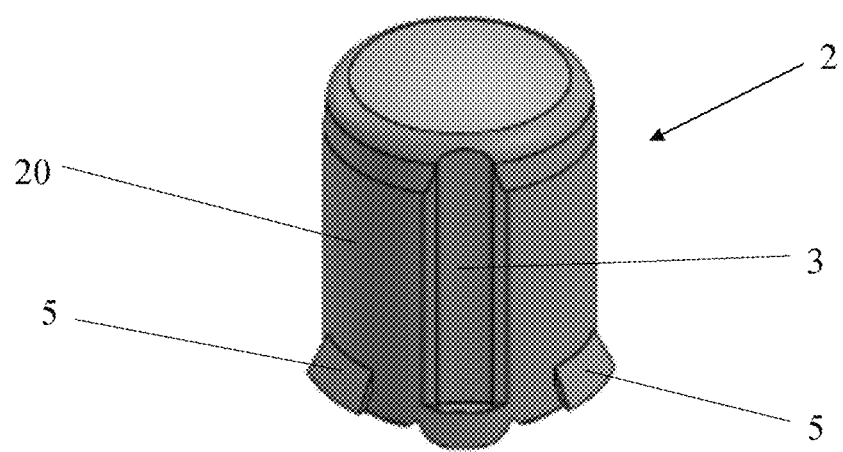
FIG. 4 is a perspective view of the inner body of the cap of FIG. 1.
Figure 5:
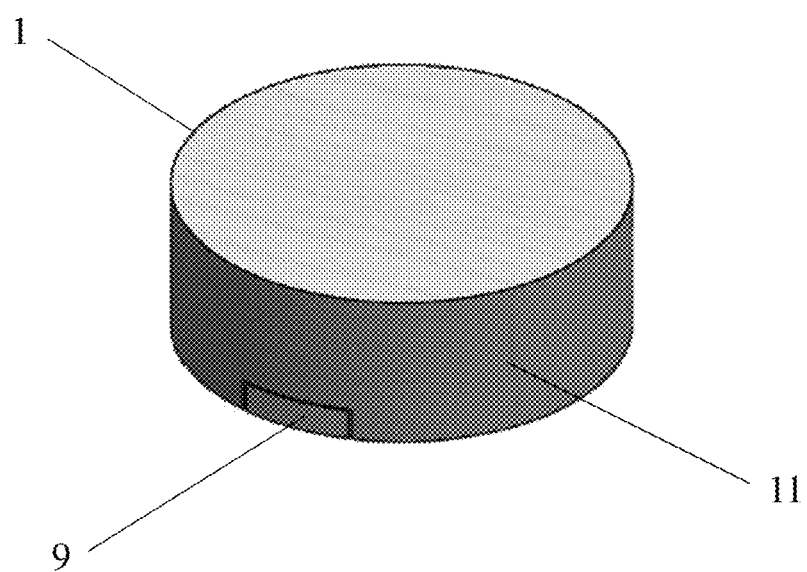
FIG. 5 is a perspective view of a second embodiment of the cap of the invention once assembled.

In this embodiment, the fixing means comprise a plurality of protuberances (3) radially protruding from the inner face of the inner body (2), as can be seen more clearly in FIGS. 2 and 4.

The outer body (1) is made of a biodegradable material of plant origin, such as wood, while the inner body (2) can be made of a plastic material, with the outer body (1) and inner body (2) being coupled by coupling means configured for linking the two bodies to one another throughout the functional or service life thereof. Advantageously, the cap includes a single-use release system configured for separating the outer body (1) from the inner body (2), such that it allows subsequent recycling thereof by the user in a separate manner once use thereof is no longer necessary.

Now making particular reference to the release system, it is comprised of a plurality of perforated lines (4) (see FIG. 2), arranged in a side wall (20) that is part of the inner body (2), which lines extend from the lower rim towards the opposite end. As can be seen, each of the perforated lines (4) is defined by a cross-section having a smaller thickness than the rest of the side wall (20). To make it easier for the user to release the inner body (2) from the outer body (1), the inner face of the lower edge of said inner body has a recess (23) (see in greater detail in FIG. 2) defined by an inclined surface made along the diameter which allows the user to insert a fingernail so as to allow an outward pressure to be applied on the inner body (2).

Figure 3:
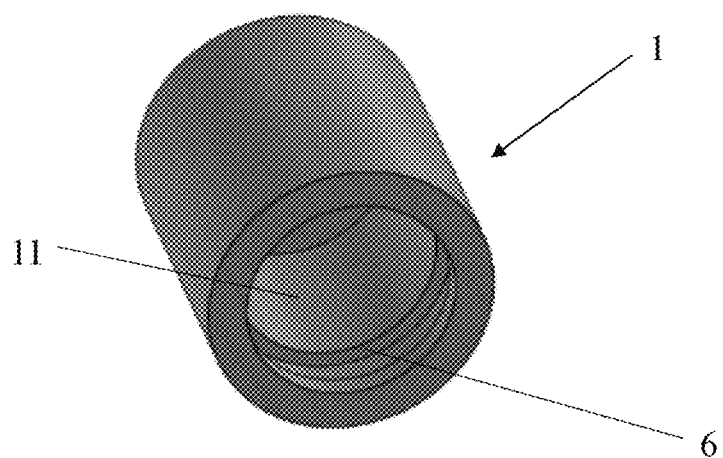
FIG. 3 is a perspective view of the outer body of the cap of FIG. 1.

Going back again to the aforementioned coupling means, said means consist of a plurality of tabs (5) radially projecting from the outer face of the side wall (20) of the inner body (2) (see FIG. 4), which fit in a non-releasable manner in a housing consisting of a circumferential slot (6) made on the inner face of the side wall (11) of the outer body (1) (see FIG. 3). Therefore, once the tabs are inserted during the process of assembling the cap, it is no longer possible to separate the two bodies (1, 2) without previously breaking the inner body (2) through the perforated lines (4).

Example 2

The same parts that are common with or identical to those of Example 1 are indicated using the same reference numbers.

In this example, as can be seen in FIGS. 5 to 8, like in the preceding example, the recyclable cap for containers comprises an outer body (1) and an inner body (2), provided with fixing configured for being fixed to an opening of a container (not depicted), with the inner body (2) being coupled and housed inside said outer body (1).

Figure 7:
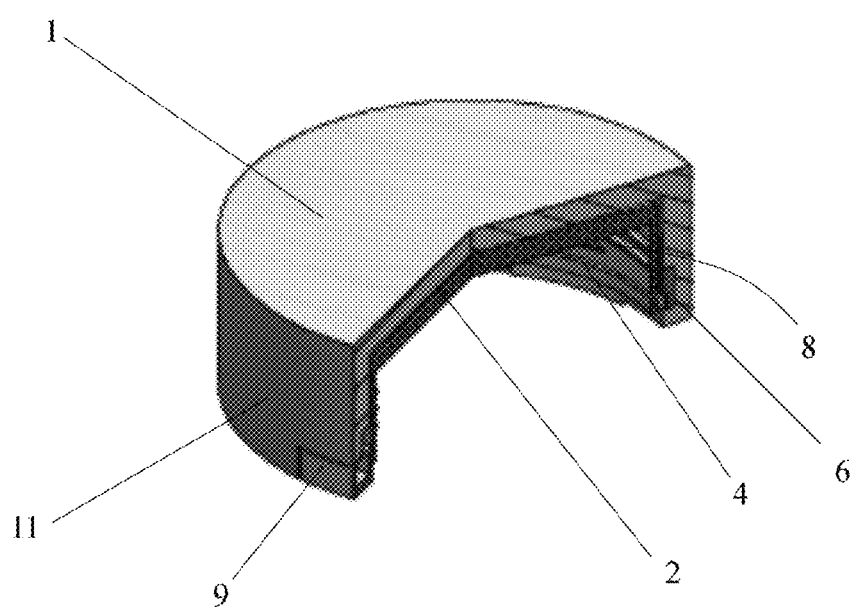
FIG. 7 is a sectioned perspective view of the cap shown in FIGS. 5 and 6.
Figure 8:
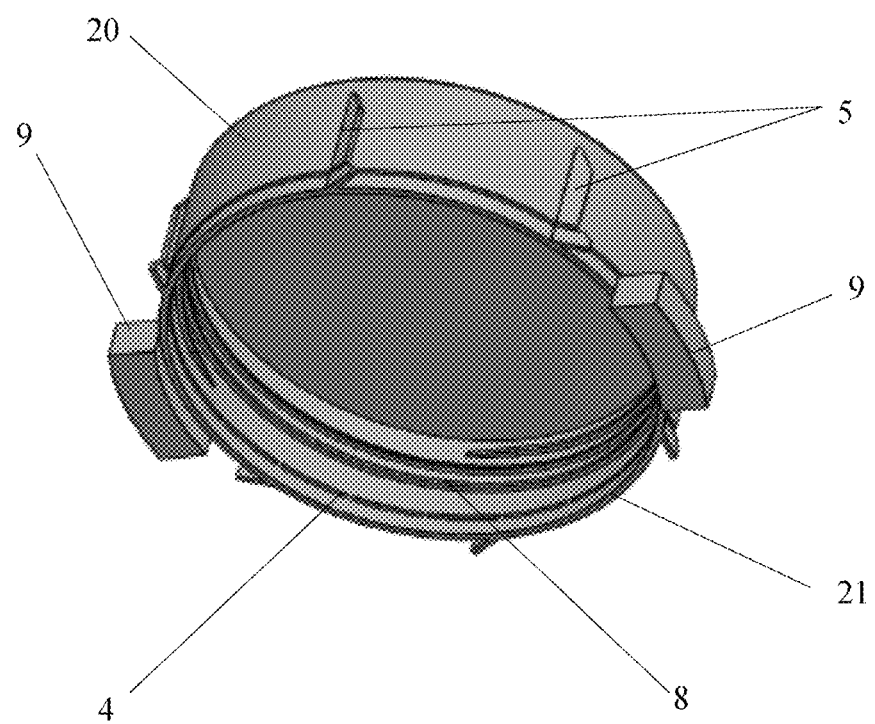
FIG. 8 is a perspective view of the inner body that is part of the cap of the second embodiment.
Figure 9:
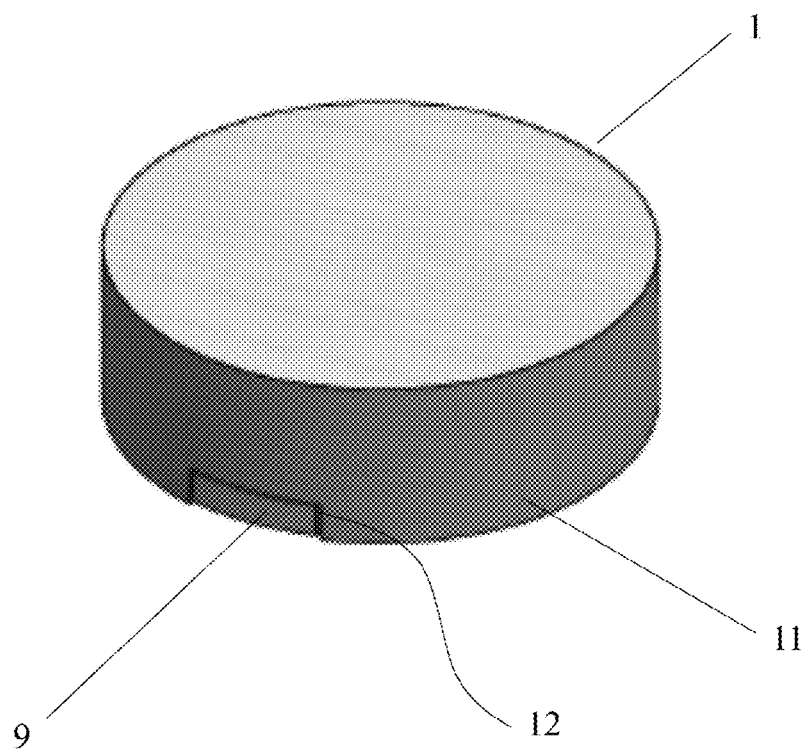
FIG. 9 is a perspective view of a third embodiment of a cap according to the present invention.
Figure 10:
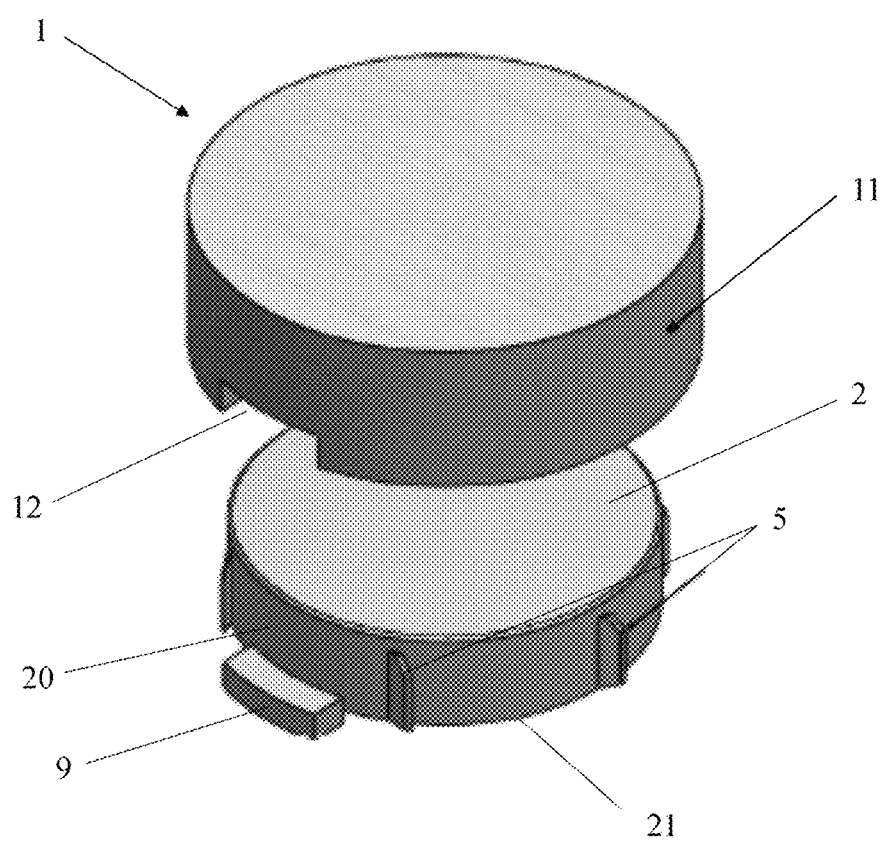
FIG. 10 is an exploded perspective view of the cap depicted in FIG. 9.
Figure 11:
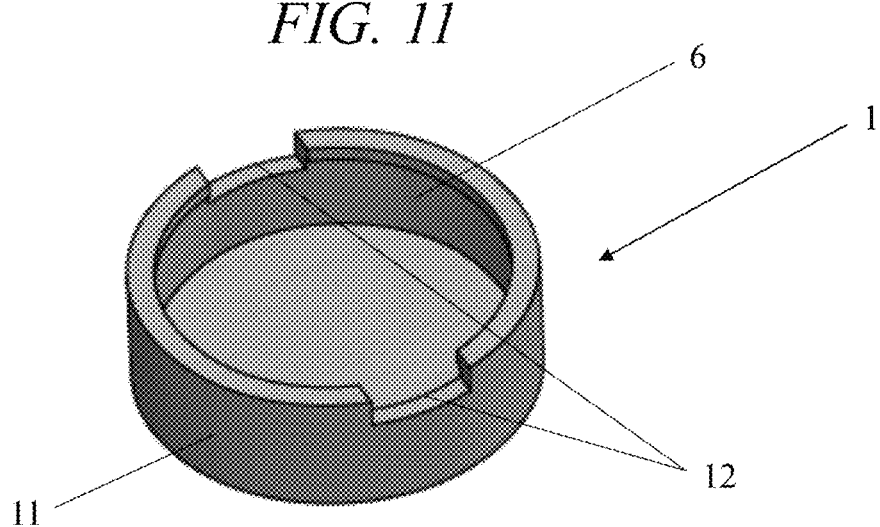
FIG. 11 is a perspective view of the outer body that is part of the third embodiment of the cap of the invention.

In this example, the fixing means comprise a threading (8) made on the inner face of the side wall (20) of the inner body (2), as shown in FIGS. 7 and 8, intended in this case for being coupled in a threaded segment present on the neck or opening of a container.

Like in Example 1, the outer body (1) is made of a biodegradable material of plant origin, such as wood, with the outer body (1) and the inner body (2) being coupled to one another by coupling means configured for linking the two bodies to one another, and anti-rotation blocking means, the inner body including a single-use release system configured for separating the outer body from the inner body (2).

In the present example, the release system is essentially comprised of a perforated line (4), formed by a plurality of breaking points, which is arranged on the side wall (20) present in the inner body (2), running along the diameter and parallel to the rim (21) of the lower end of the inner body (2).

Figure 6:
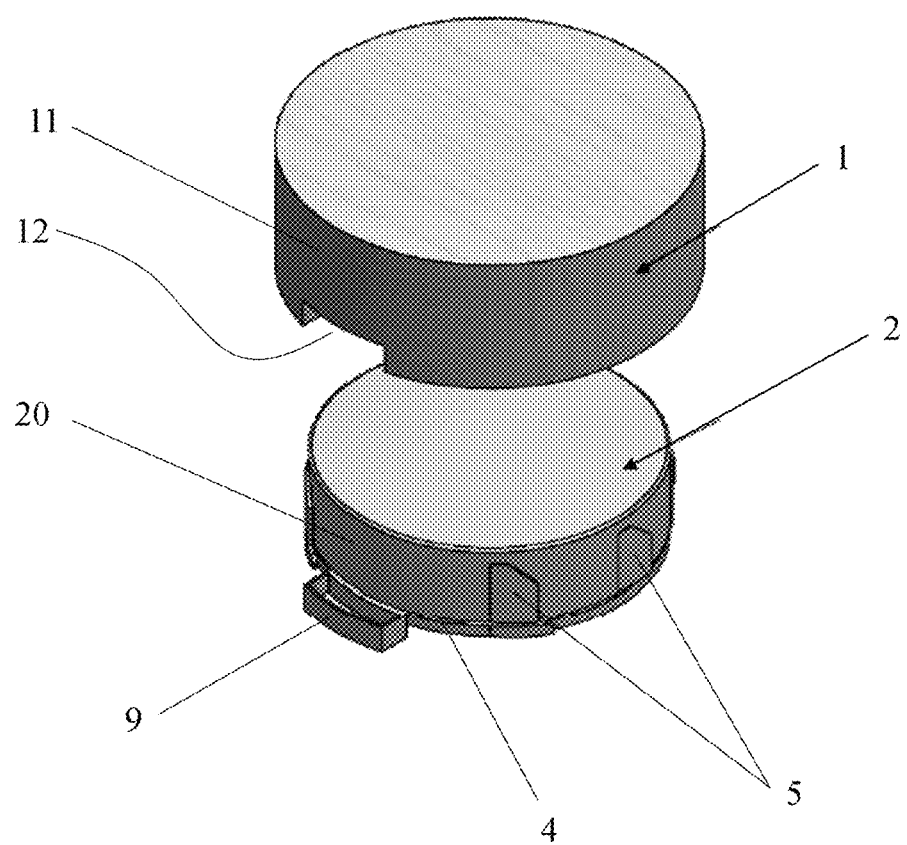
FIG. 6 is an exploded perspective view of the cap depicted in FIG. 5.

Going back again to the aforementioned coupling means, they consist of a plurality of tabs (5) radially projecting from the outer face of the side wall of the side wall (20) of the inner body (2), as can be seen in FIGS. 6 and 8. The tabs (5) are slightly bent to make it easier to insert the inner body (2) into the outer body (1) during the process of assembling and attaching the two bodies (1, 2), with said tabs (5) being dimensionally configured so as to be inserted into a circumferential slot (6).

Furthermore, as mentioned above, the cap includes anti-rotation blocking means comprising a flange (9) protruding out of the side wall (20) of the inner body (2), being fitted in an immovable manner in a groove (12) made in the side wall (11) of the outer body (1). Furthermore, this flange (9) also serves as a starting area to make it easier to break the perforated line (4) in a simple and practical manner.

Example 3

The same parts that are common with or identical to those of the preceding examples are indicated using the same reference numbers.

Like in the preceding example, the outer body (1) is made of a biodegradable material of plant origin, such as wood, with the outer body (1) and the inner body (2) being coupled by coupling means configured for linking the two bodies (1, 2) to one another, and anti-rotation blocking means, the inner body including a single-use release system configured for separating the outer body from the inner body (2).

The stopper includes anti-rotation blocking means comprising a pair of flanges (9), positioned so as to be diametrically opposite to one another, protruding out of the side wall (20) of the inner body (2), being able to be fitted in an immovable manner in a groove (12) made in the side wall (11) of the outer body (1). Furthermore, this flange (9) also serves as a starting area to make it easier to break the perforated line (4) in a simple and practical manner.

Going back again to the aforementioned coupling means, they consist of a plurality of tabs (5) radially projecting from the outer face of the side face of the outer wall (20) of the inner body (2), being dimensionally configured so as to be inserted into a circumferential slot (6).

Figure 12:
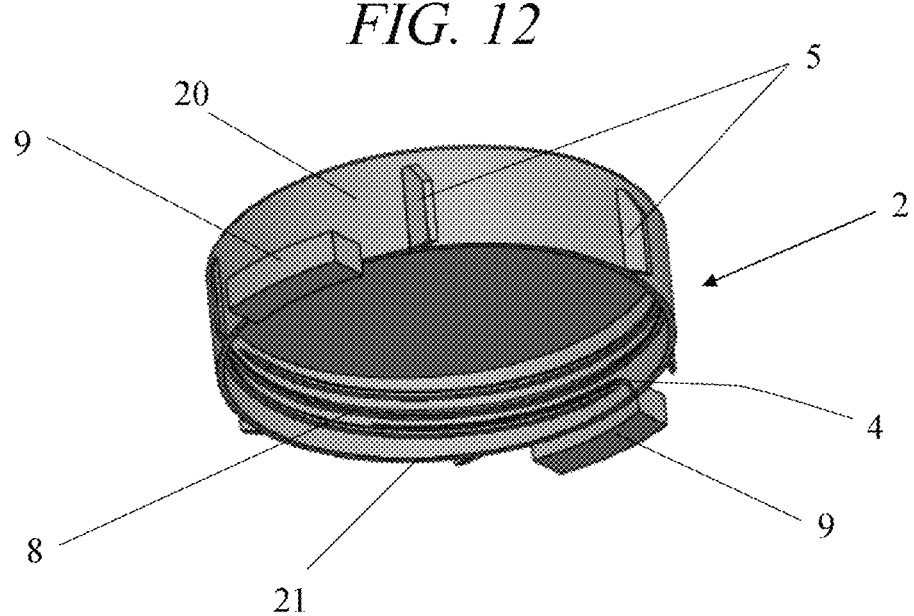
FIG. 12 is a perspective view of the inner body that is part of the third embodiment of the cap of the invention.

This cap, depicted in FIGS. 9 to 12, has the same features as the cap in Example 2, with the main difference being the release system which is essentially comprised of a perforated line (4) extending perpendicularly from the rim (21) until contacting the threaded segment (8) present in the inner body (2) (see FIG. 12).

Figure 13:
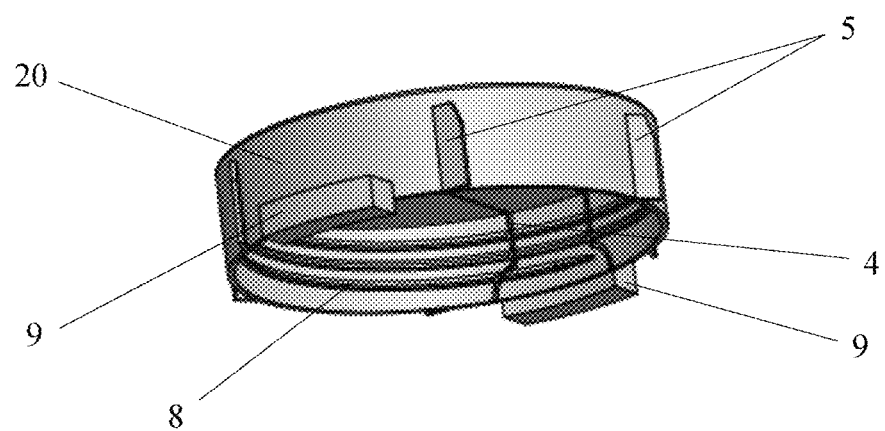
FIG. 13 is a perspective view of an alternative embodiment of the inner body of the cap of the invention.
Figure 14:
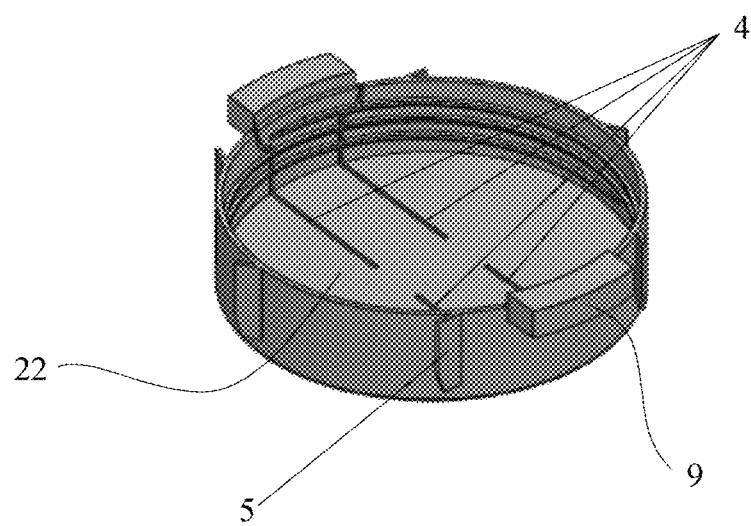
FIG. 14 is a bottom perspective view of the inner body depicted in FIG. 13.

Finally, there can be seen in FIGS. 13 and 14 an alternative of the inner body (2), which also has on the inner portion a threaded segment (8) also intended for being coupled in a threaded segment present on the neck or opening of a container, which essentially differs in the route covered by the perforated line (4) given that it extends from the rim (21) and in the upward direction along the side wall (20) to a region defined in a base segment (22) of the inner body (2). In this case, four perforated (or breaking) lines (4) extending from the area where the flanges (9) are located have been defined.

The details, shapes, dimensions and other accessory elements, used to manufacture the recyclable cap of the invention, may be suitably substituted for others which do not depart from the scope defined by the claims which are included below.

What is claimed is:

1. A recyclable cap for containers comprising:
an outer body; and
an inner body provided with fixing means for being retained on a container, the inner body being coupled and housed inside said outer body, the outer body being made of a biodegradable material of plant origin,
wherein the outer body and the inner body are coupled by coupling means configured for linking the two bodies to one another,
wherein the inner body includes a single-use release system configured for separating the outer body from the inner body, the single-use release system comprises at least one perforated line present in a side wall present in the inner body, and
wherein the coupling means consist of tabs projecting from the outer face of the inner body, which can be fitted in a non-releasable manner in slots made on the inner face of the outer body.

2. The recyclable cap according to claim 1, wherein the at least one perforated line extends from a rim at one end towards the opposite end.

3. The recyclable cap according to claim 1, wherein the at least one perforated line runs along the diameter and parallel to the rim at one end of the inner body.

4. The recyclable cap according to claim 1, wherein the at least one perforated line is formed by a cross-section having a smaller thickness than the rest of the side wall of the inner body.

5. The recyclable cap according to claim 1, wherein the at least one perforated line is formed by a die cut line running along the side wall.

6. The recyclable cap according to claim 1, wherein an anti-rotation blocking means integrally fixes the inner body and the outer body together when they are assembled to one another are provided.

7. The recyclable cap according to claim 6, wherein the anti-rotation blocking comprises a flange protruding out of the inner body which can be fitted in an immovable manner in a groove made on the side face of the outer body.

8. The recyclable cap according to claim 1, wherein the fixing means comprise a threading made on the inner face of the inner body.

9. The recyclable cap according to claim 1, wherein the fixing means comprise protrusions protruding from the inner face of the side wall of the inner body.

10. The recyclable cap according to claim 1, wherein the release system comprises a plurality of perforated lines.

11. The recyclable cap according to claim 10, wherein at least one perforated line of the plurality of perforated lines is formed by a die cut line running along the side wall.

12. The recyclable cap according to claim 1, wherein the inner face of the lower edge of the inner body has a recess defined by an inclined surface.

13. The recyclable cap according to claim 1, wherein the material of the outer body consists of wood or a wood-based composite.

* * * * *